United States Patent
McQuaid (12)

(10) Patent No.: US 6,491,783 B2
(45) Date of Patent: *Dec. 10, 2002

(54) PROCESS FOR COATING AND LAMINATING FILM USING 100% SOLIDS ADHESIVE AT ROOM TEMPERATURE

(75) Inventor: Peter J. McQuaid, York, PA (US)

(73) Assignee: Adlamco, Inc.

(*) Notice: Subject to any disclaimer, the term of this patent is extended or adjusted under 35 U.S.C. 154(b) by 0 days.

This patent is subject to a terminal disclaimer.

(21) Appl. No.: 09/835,565

(22) Filed: Apr. 17, 2001

(65) Prior Publication Data

US 2002/0079051 A1 Jun. 27, 2002

Related U.S. Application Data

(63) Continuation-in-part of application No. 09/699,437, filed on Oct. 31, 2000.

(51) Int. Cl.$^7$ ................................................. C09J 5/00
(52) U.S. Cl. ..................... 156/330; 427/207.1; 427/428
(58) Field of Search ............................. 156/332, 335, 156/330; 523/403, 406, 412, 413, 416, 418, 426, 429; 427/207.1, 428

(56) References Cited

U.S. PATENT DOCUMENTS 4,590,855 A * 5/1986 Schommer et al. ......... 101/157
5,681,907 A * 10/1997 Starner et al. ............... 525/526
5,731,090 A * 3/1998 Chen ......................... 428/423.5
5,780,555 A * 7/1998 Corley et al. ................ 525/407

OTHER PUBLICATIONS

The Condensed Chemical Dictionary, Van Nostrand Reinhold Company, Tenth edition, 1981, p. 899.*

* cited by examiner

Primary Examiner—Richard Crispino
Assistant Examiner—Sing P Chan
(74) Attorney, Agent, or Firm—H. Jay Spiegel (57) ABSTRACT

A laminating and coating system is employed with a gravure or flexographic set up using an enclosed doctor blade system with recirculation to coat adhesive onto a film and then laminate it to another film. The preferred adhesive is a two-stage epoxy consisting of a zero VOC 100% solids laminating adhesive having a viscosity of 200–1500 cps which remains within a desired range of 50–100 degrees F for up to 3 hours that will cure at ambient temperature. The adhesive is solventless and is unaffected by moisture. The adhesive consists of ingredients which make it permissible for use as an adhesive for laminations of films designed for food packaging pursuant to F.D.A. Regulation 175.105. The adhesive is formulated to avoid emission of odors and can be used in a four or five roll coating system.

38 Claims, 5 Drawing Sheets

E.E.W. — Epoxide Equivalent Weight
A.H.E.W. — Amine Hydrogen Equivalent Weight
phr — Parts of Curing Agent per 100 Parts Epoxy Resin

PROCESS FOR COATING AND LAMINATING FILM USING 100% SOLIDS ADHESIVE AT ROOM TEMPERATURE

This application is a Continuation-in-Part of application Ser. No. 09/699,437, filed Oct. 31, 2000.

BACKGROUND OF THE INVENTION

The present invention relates to a process for coating and laminating film using 100% solids adhesive at room temperature.

Traditionally, when preparing some packaging intended to be used to package food products, film is printed on one side, adhesive is applied on top of the printing as well as on the clear areas surrounding the printing, and then the film is laminated to a second film at a laminating nip. In in-line printing, the adhesive is coated on top of the freshly printed ink or the opposite web and immediately thereafter is laminated.

On web machines having a width of 30 inches to 60 inches or more, coating is typically accomplished by employing rotogravure and flexo coating, although other techniques may be used. In many cases, lamination is accomplished "out of line", meaning that a printed roll is taken to another location for lamination.

In the early years of lamination of such packaging materials, solvent borne polyurethane adhesives were employed that gave good "green" tack and cured further to create good laminations. Over the last 20 years, water borne adhesives have replaced many of the solvent-based adhesives due to the reduction of emissions of noxious vapors (VOCs). Of course, solvent-based adhesives are still employed. Water borne adhesives include urethanes, acrylics and other hybrids.

As the industry has evolved, the desire to reduce solvent emissions created a demand for water-based adhesives. However, a 100% solids polyurethane chemistry using a very expensive four or five roll coating head evolved and is currently making big inroads into the market for laminating adhesives. Such systems are prevalent in Europe and are gaining more acceptance in the United States. When the four or five roll coating head systems are used, no oven is employed for drying but most of the adhesives, if not all of them, must be kept hot or heated during application because the adhesives have high viscosities. As should be understood, heating the adhesives reduces the viscosity. However, at the same time, application of heat severely reduces pot life. In other words, application of heat initially reduces viscosity but speeds the initiation of the exothermic reaction that results in adhesive curing and rapid viscosity increase. The pot life of an adhesive is the time period from the moment it is mixed until the moment the exothermic curing reaction begins to make it unusable. When reaction begins, viscosity rapidly increases.

The adhesives employed with the four or five roll coating system are typically two component systems that must be mixed. Such adhesives are adversely affected by moisture in the air and their higher viscosity, in the range of 1000 cps or more, requires use of the four or five roll coating system.

In the normal use of 100% solids urethane adhesives, there is a major health issue that has surfaced in which the urethanes can pose a health hazard when used in laminating film for flexible packaging used for foodstuffs. In essence, the isocyanate in the adhesive reacts and can form aromatic diamine which is a suspected health hazard and which can also migrate through the film.

For some convertors using the four or five roll system, they heat the polyurethane adhesives as high as 150° to 160° F. in order to obtain a runnable viscosity. When such heating is done and the film is run at a speed of over 500 feet per minute, misting can occur which fouls many of the parts of the machinery, and contaminates the atmosphere around the machine thereby creating a potential health hazard for the operator of the machine. To prevent this problem, often, the machinery must be slowed down to prevent misting. Although, four and five roll coating systems can run adhesives having a viscosity of 1,000 cps or higher, the misting issue must be addressed in order to effectively coat film while avoiding expensive machinery upkeep and danger to the health of the machine operator.

Often, products are sold using a "just in time" inventory storage procedure and, due to this procedure, demand is increasing for packaging that may be printed and laminated on narrow web presses such as those having a width of 26 inches or less. One example of such an application is the creation of bottle labels of film-film laminations. Flexographic presses are often used to print images on the film. In such systems, in order to make the presses capable of laminating, a system was devised to use an ultraviolet cured adhesive having a low enough viscosity to allow coating by flexographic presses with curing being accomplished immediately thereafter using an ultraviolet light source. Ultraviolet curing has a severe limitation—it cannot be used to cure adhesive on a metallized web combined with a reverse printed web because the ultraviolet light will not penetrate the ink or metal. The same is true where the film is white or opaque.

As is well known in the art, water or solvent-based adhesives are not preferred to be used on flexographic presses because it is quite difficult to apply a sufficient amount of adhesive in a flexographic press and such adhesives are difficult to dry. With typical printing, it has been found that the only way to use water or solvent-based adhesives in a flexographic press is to slow the speed of production or equip with a much larger drying oven. Limitations on production speed are problematic. Thus, the ultraviolet curing system is a preferred system for use with narrow width presses with the UV cured adhesive having a viscosity of about 300 cps.

Such a system works adequately for ultraviolet bottle label applications but has been found to be unacceptable for applications where one of the films comes into contact with a food product. It has been found that the ultraviolet photoinitiators do not fully respond to the ultraviolet light and, as such, the U.S. Food and Drug Administration has not accepted such adhesives for use in indirect food packaging.

Manufacturers of solvent borne adhesives have attempted to make very high solids (65%) adhesives that can be coated on a gravure press. Such an application reduces the emissions but has not been commercially successful. Water-based adhesives comprising up to 60% solids have been developed with such configuration helping in drying and coating weight but only limited applications have been found for such adhesives.

The adhesive disclosed in Parent application Ser. No. 09/699,437 includes, in some formulations, a flexible epoxy known as DOW 736. Applicant has found that this flexible epoxy causes emission of odors that preclude use of the inventive adhesive in applications where the foodstuff has the ability to absorb odors. One example of such a foodstuff is coffee. As such, a need has developed for an adhesive that will effectively adhere films together without odor emission.

Applicants are aware of U.S. Pat. No. 4,216,252 to Moeller which discloses a solventless release coating. While the solventless nature of the release coating is analogous to the adhesive employed in the inventive process of the present invention, the particular coating employed is significantly different from the adhesive employed herein, and is used for a different purpose.

Each of the techniques and adhesives described above presents significant limitations of one kind or another, whether it be noxious emissions, including misting, requirement for quick production, difficulties in uniform curing, heating requirements coupled with short pot lives, etc. Additionally, some adhesives can cause smudging or bleeding of some inks used to print on the films to be laminated which can cause poor print quality on the finished packaging. As such, a need has developed for a coating technique that employs an adhesive having a sufficiently low enough viscosity at room temperature to permit even and predictable flow, wherein the adhesive does not emit noxious fumes, is not affected by moisture, where pot life is extended to a sufficient degree to increase efficiency of production, and wherein the adhesive employed in the process is deemed acceptable by the U.S. Food and Drug Administration for use in laminating packaging to be used to package food products, and wherein smudging or bleeding of the inks may be reduced.

It is with these problems and needs in mind that the present invention was developed.

SUMMARY OF THE INVENTION

The present invention relates to a process for coating and laminating film using 100% solids adhesive at room temperature. The present invention includes the following interrelated objects, aspects and features:

(1) In a first aspect, Applicants have found that a superior system for conducting the inventive process consists of a two doctor blade coating system. In such a system, two doctor blades combine with other structure to form an enclosed chamber which receives adhesive. The adhesive is pumped into the chamber and, within the chamber, engages a portion of the circumference of a roll having a surface texture. While this roll may be described as "knurled", it is more accurately called an anilox roll or gravure cylinder. It may be engraved or ceramic coated with one of several patterns laser etched into the surface. This roll will be described hereinafter as "knurled" and is considered to contemplate all of the alternatives described above. The chamber has an exit allowing adhesive to be recirculated during conducting of the process. A circulating pump is employed that pumps adhesive from a sump to the enclosed chamber and the sump receives adhesive recirculated back from the enclosed chamber. Adhesive is mixed and supplied to the sump while the process is being conducted so that the enclosed chamber is continuously full of adhesive.

(2) In the system employed in conducting the inventive process, neither the blades nor the nip are heated and the process is conducted at room temperature. The blades may be water cooled to offset heat generated by frictional interaction between the blades and knurled roll to maintain adhesive temperature at desired temperature.

(3) In one example of the operation of the inventive process, in order to make sure that the chamber defined by the doctor blades is always maintained full of adhesive, the recirculating pump is designed to pump adhesive at a flow rate twice the rate of usage of adhesive by the system.

(4) One example of an adhesive that Applicants have found suitable for use in conducting the inventive process is a two-stage epoxy having part A and part B with the mixing ratio being two parts by weight of part A mixed with one part by weight of part B, although this ratio may be varied.

(5) The adhesive preferably includes the following constituent ingredients:

Part A: 51% by weight Aliphatic DIEPOXIDE Epoxy Resin, 34% by weight Bisphenol A Type Epoxy Resin, 1% Nonionic defoamer (Example: Air Products DF-75), 13% Dipropylene Glycol Dibenzoate, and 1% by weight Silicone Free surfactant (Example: Air Products SEF).

Part B consists of 79% by weight Amidoamine curing agent, 20% by weight Aliphatic Amidoamine curing agent, 0.5% by weight defoamer as described above, and 0.5% by weight surfactant as described above.

The proportions of the constituent ingredients may be varied as will be described in greater detail hereinafter.

(6) The adhesive is a zero VOC 100% solids laminating adhesive having a mixed viscosity of preferably 200–1500 cps with the viscosity remaining within a desired range at room temperature, defined as a temperature range of 50–110 degrees F for up to 3 hours. In certain applications, such as where a four or five coating method is employed, the viscosity can be adjusted to be as high as 1500 cps. The adhesive is solventless and is unaffected by moisture. Applicants have found that curing of the adhesive will take place for most substrates within 48 hours. The adhesive may be cleaned using IPA (isopropyl alcohol) for at least six hours after mixing and can be cleaned using toluene up to 1 day after mixing. As an important aspect, the adhesive consists of ingredients which make it permissible for use as an adhesive for laminations of films designed for food packaging pursuant to F.D.A. Regulation 175.105. The inventive adhesive does not emit strong odors.

(7) Any adhesive that possesses the properties of the adhesive as described above and which complies with F.D.A. Regulation 175.105 would be a suitable substitute therefor in the inventive process.

(8) Hereinabove, in the BACKGROUND OF THE INVENTION, Applicants discussed the difficulty of trying to coat high solids adhesive using gravure coating. Such high solids adhesive typically comprises urethane. An advantage of the present invention is the ability to coat 100% solids adhesive by gravure coating technique. Such a technique may be performed both in-line, usually by applying the adhesive to an unprinted web with its own oven, as well as out-of-line on a separate machine. Such a technique can also be accomplished in the last deck of a flexopress as would be done on a narrow machine. The wide web application is extremely important since the wider web increases the amount of surface area per unit time that flows through the machine. Thus, the wider web consumes a much higher amount of adhesive than narrow web applications. Through the use of the present invention, by eliminating the adhesive drying oven, one may double production from, for example, 400 to 500 feet per minute of film to 800 to 1000 feet per minute of film. Additionally, the use of the inventive adhesive in the inventive process reduces costs since energy costs expended for drying the adhesive in an oven are eliminated.

(9) In a typical in-line wide web printing and laminating operation, the coating method is gravure. Such a method of application facilitates putting a heavier coating weight down to obtain satisfactory bonding, but requires a large oven to dry the solvent or water from the adhesive. Again, through the teachings of the present invention, the oven is eliminated. The etch of the knurled cylinder determines the coating weight. Through the use of the present invention, the etch is much finer than usual since only solids are applied instead of solids plus carrier, whether the carrier is a solvent or water. Of course, additionally, the hot nip is also eliminated, which also eliminates curling of the finished product due to the avoidance of exposure to heat both in the oven and in the nip.

(10) In such a system, the print ovens are very small with short dwell time as compared to the size and dwell time of the adhesive oven. This disparity is due to the thinness of the ink coating as compared to the thickness of the adhesive coating. In narrow web flexo-operations where water-based adhesive is applied, high solids adhesives are used in order to obtain a coating weight that is sufficiently heavy enough to work while being easy to dry. In the gravure process, one fewer roll is used as compared to the flexoprocess. In gravure, two rolls are used whereas in flexo, three rolls are used.

(11) The process in accordance with the teachings of the present invention can also be used in extrusion coating. In extrusion coating, the adhesive can be applied by gravure and when the hot extrudate hits the adhesive during the laminating process, it is cured in the range of 80% cure instantaneously. As before, the extrusion process does not require the oven. A typical gravure application will apply the adhesive and the web is then conveyed to the nip where hot molten polyethylene, polypropylene or other materials are extruded to the adhesive. If desired, a second web is brought in to laminate with the first-mentioned web, but this is not absolutely necessary. One or both webs can be printed. Such a process is a superior application since high speed process can be undertaken without a drying problem and with instantaneous bonding.

(12) Applicant has found that there is a high interest in 100% solids adhesive technology for use by wide web convertors, namely, four or five roll coating systems. Such systems typically are able to use higher viscosity adhesive products because the plurality of rolls facilitates spreading of the adhesive to a thickness that may be effectively coated despite the relatively high viscosity.

(13) The adhesives disclosed herein may advantageously be used in a four or five roll coating system, even at a high rate of speed, from 500 feet per minute to as much as 1,500 feet per minute, because the inventive adhesives do not create aromatic diamine or other odors and are highly resistant to misting even at such high coating speeds.

(14) The adhesives disclosed herein are highly advantageous over adhesives currently used in coating processes, particularly since they are able to run at room temperature. As should be understood, running at room temperature avoids the expense of providing heaters and supplying them with energy. Furthermore, when one runs at room temperature, the viscosity of the adhesive remains substantially uniform throughout the coating process, thereby maintaining the coating weight substantially uniform. Where the operator feels the need to heat a drum of adhesive, typically, the heating is done externally and creates a temperature gradient in which the adhesive around the periphery of the drum is hotter than the adhesive at the center within the drum. Such non-uniformity creates variance in coating weights that is problematic. The present invention eliminates this problem.

(15) In practicing the teachings of the present invention, Applicant has been required to take viscosity measurements of the inventive adhesives. For this purpose, Applicant has employed a Brookfield Viscometer Model DV2+ using an S-27 spindle at 25° C.±1°.

Accordingly, it is a first object of the present invention to provide a process for coating and laminating film using 100% solid adhesives at room temperature It is a further object of the present invention to provide such a process wherein the adhesive employed does not emit VOCs (volatile organic compounds).

It is a further object of the present invention to provide such a process wherein the adhesive employed is solventless, possesses low viscosity, and maintains a relatively steady viscosity at room temperature.

It is a still further object of the present invention to provide such a process wherein the adhesive employed is unaffected by moisture and may be used to laminate films to be used as packaging for food products pursuant to F.D.A. Regulation 175.105.

It is a yet further object of the present invention to provide such a process wherein a two doctor blade laminating system is employed wherein adhesive is recirculated to and from a chamber partially defined by the doctor blades.

It is a still further object of the present invention to provide such a process wherein the adhesive employed is resistant to misting and may be formulated to have a viscosity up to 1,500 cps at room temperature.

It is a still further object of the present invention to provide a process in which the inventive adhesive may be used in a four or five roll coating process while avoiding misting and creation of vapors while running at high speeds as much as 500 to 1,500 feet per minute.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
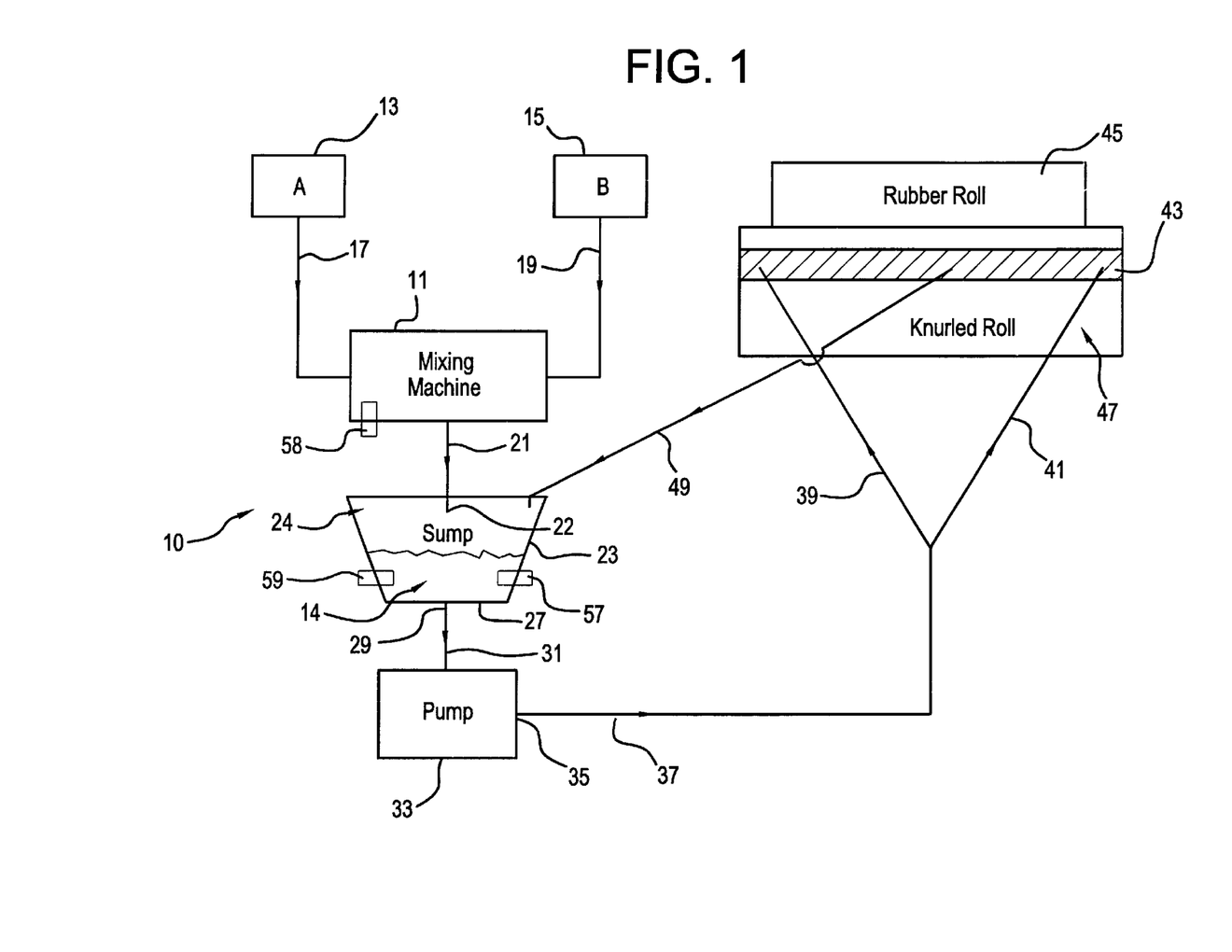
FIG. 1 shows a schematic representation of a two blade enclosed chamber fountainless gravure coating and laminating system.
Figure 2:
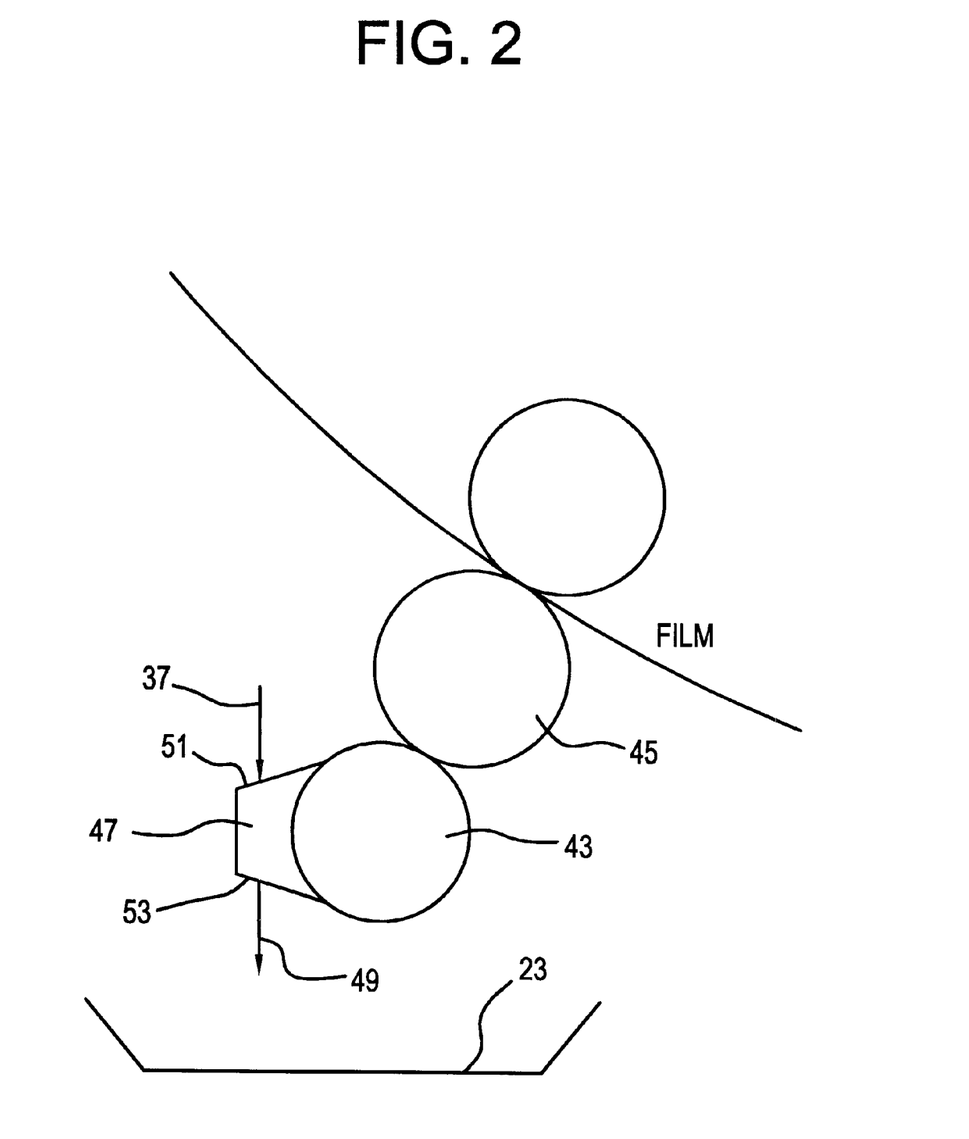
FIG. 2 shows a further schematic representation of the system depicting the enclosed chamber and the doctor blades.
Figure 3:
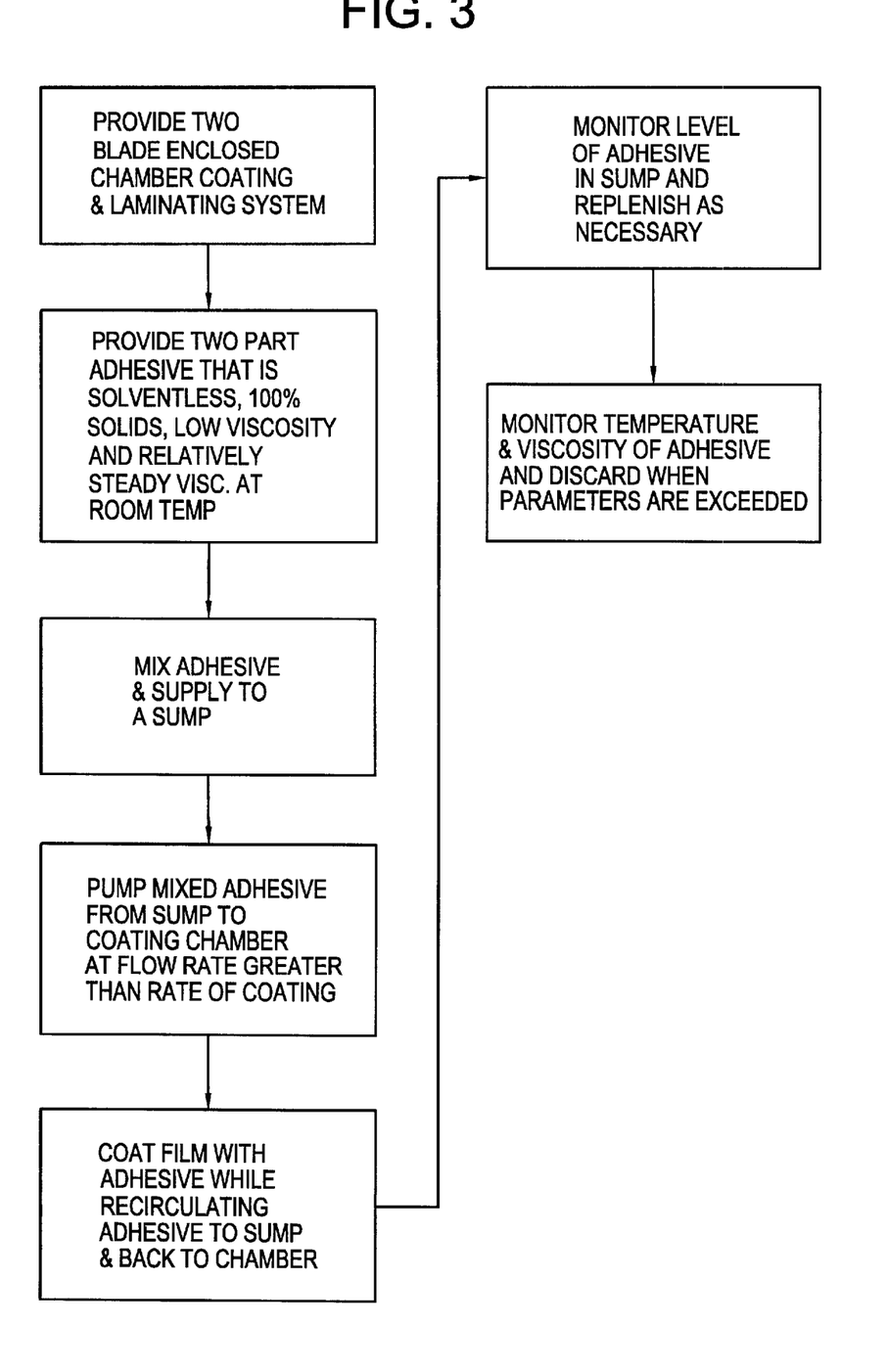
FIG. 3 shows a flowchart of the practice of the inventive process.

With reference to FIG. 3, it is seen that in a first preferred embodiment of the inventive process, the first step is to provide a two blade, enclosed chamber coating and laminating system. With reference to FIGS. 1 and 2, such a system is schematically depicted and generally referred to with the reference numeral 10. The system is seen to include a mixing machine 11 which receives parts A and B of a two part adhesive from the respective containers 13 and 15 via the respective supply lines 17 and 19. The mixing machine 11 may be of any suitable type for thoroughly mixing the parts A and B of the adhesive. The mixing machine 11 supplies the mixed adhesive to a sump 23 via a supply line 21 that has an outlet 22 within the chamber 24 of the sump 23.

At the bottom surface 27 of the sump 23, an outlet 29 is provided to which is coupled a conduit 31 that supplies mixed adhesive 14 to a pump 33. The pump 33 has an outlet 35 to which is coupled a conduit 37 that supplies mixed adhesive 14 from the pump 33 to two branch conduits 39 and 41 having respective outlets adjacent a knurled roll 43 which is designed to evenly spread the adhesive 14 thereover by virtue of the knurled periphery thereof. A rubber roll 45 engages the knurled roll 43 and receives a uniform coating of adhesive 14 thereover. The adhesive is then transferred from the rubber roll to the substrate. In a gravure system, the rubber roll 45 is omitted and the adhesive is transferred directly to the film from the knurled roll 43. Adhesive is recirculated to the sump via return line 49. The mixing machine 11, sump 23, pump 33, and conduits 37, 39 and 41 may be described as supply means for supplying mixed adhesive to the coating chamber 47. The conduit 49 may be described as return means for returning excess adhesive to the sump 23.

With reference to FIG. 2, it is seen that the chamber 47 is defined, in part, by doctor blades 51 and 53 as well as by the surface of the knurled roll 43 which encloses the chamber 47. The doctor blades 51, 53 may be cooled by a water circulation system (not shown) in which water is circulated between the chamber 47 and a heat exchanger, whereby heat is removed from the chamber to maintain it at room temperature. Water cooling is not required for operations that do not run fast enough to raise the temperature significantly.

As shown in FIG. 1, the sump 23 includes a level sensor 57 which senses the level of adhesive 14 within the sump 23 and, when that level drops below a preset level, the system prompts operation of the mixing machine 11 and supply from the containers 13 and 15 of parts A and B of the adhesive so that the level of adhesive within the sump may be replenished to a desired level. Such automatic control is well known to those skilled in the art.

Additionally, the sump 23 may be provided with a viscosity sensor 59 that allows the user to monitor the viscosity of adhesive 14 contained within the sump 23. Applicants have found that the system will operate effectively and adhesive 14 will be uniformly coated on the rubber roll 45 provided the viscosity of the adhesive 14 is maintained below 1000 cps. As will be explained in greater detail hereinbelow, the adhesive chosen for use in the inventive process has a typical viscosity of from 200 to 400 cps within the desired operating temperature parameters, namely, a room temperature of from 50 to 110 degrees F. As will also be described in greater detail hereinafter, when the adhesive 14 begins to "set up", an exothermic reaction takes place which, of course, as is self-evident, involves giving off of heat. Higher operating temperatures for the process result in shorter pot life of the adhesive. Thus, the viscosity sensor 59, when used, senses the viscosity of the adhesive and when that viscosity exceeds, for example, 1000 cps, the user knows that it is time to stop the process and clean all adhesive from the system before new adhesive is replenished to the sump 23 from the mixing machine 11. As an alternative, the viscosity sensor 59 may be omitted and the user may visually inspect the sump and take note of thickening of the adhesive evidencing increased viscosity.

As explained hereinabove, in order to effectively operate the inventive process, an adhesive must be chosen which is described as 100% solids, solventless to avoid the emission of VOCs, low viscosity, in the range of 300 cps and certainly below 1500 cps, usable at a substantially steady viscosity at a room temperature defined as the temperature range of 50 to 110 degrees F, which adhesive is unaffected by moisture, cures at room temperature and also satisfies the requirements of F.D.A. Regulation 175.105. If these requirements are met, the adhesive may be used in a process for laminating packaging for food products. Of course, where extrusion lamination is employed, the heat of the extrudate eliminates the room temperature cure requirement.

After experimentation with a number of different types of adhesives, an adhesive was chosen that fulfills all of the required criteria. This adhesive is a two part epoxy resin-hardener combination in which one mixes two parts by weight of part A with one part by weight of part B to create the adhesive.

In the preferred embodiment, parts A and B of the adhesive include the following constituent ingredients:

| INGREDIENT | % By Weight |
|---|---|
| PART A | |
| Bisphenol A Type Epoxy Resin | 34 |
| Aliphatic DIEPOXIDE Epoxy Resin | 51 |
| Nonionic Defoamer | 1 |
| Dipropylene Glycol Dibenzoate | 13 |
| Silicone Free Surfactant | 1 |
| PART B | |
| Amidoamine Curing Agent | 79 |
| Aliphatic Amidoamine Curing Agent | 20 |
| Nonionic Defoamer | .5 |
| Silicone Free Surfactant | .5 |

Figure 5:
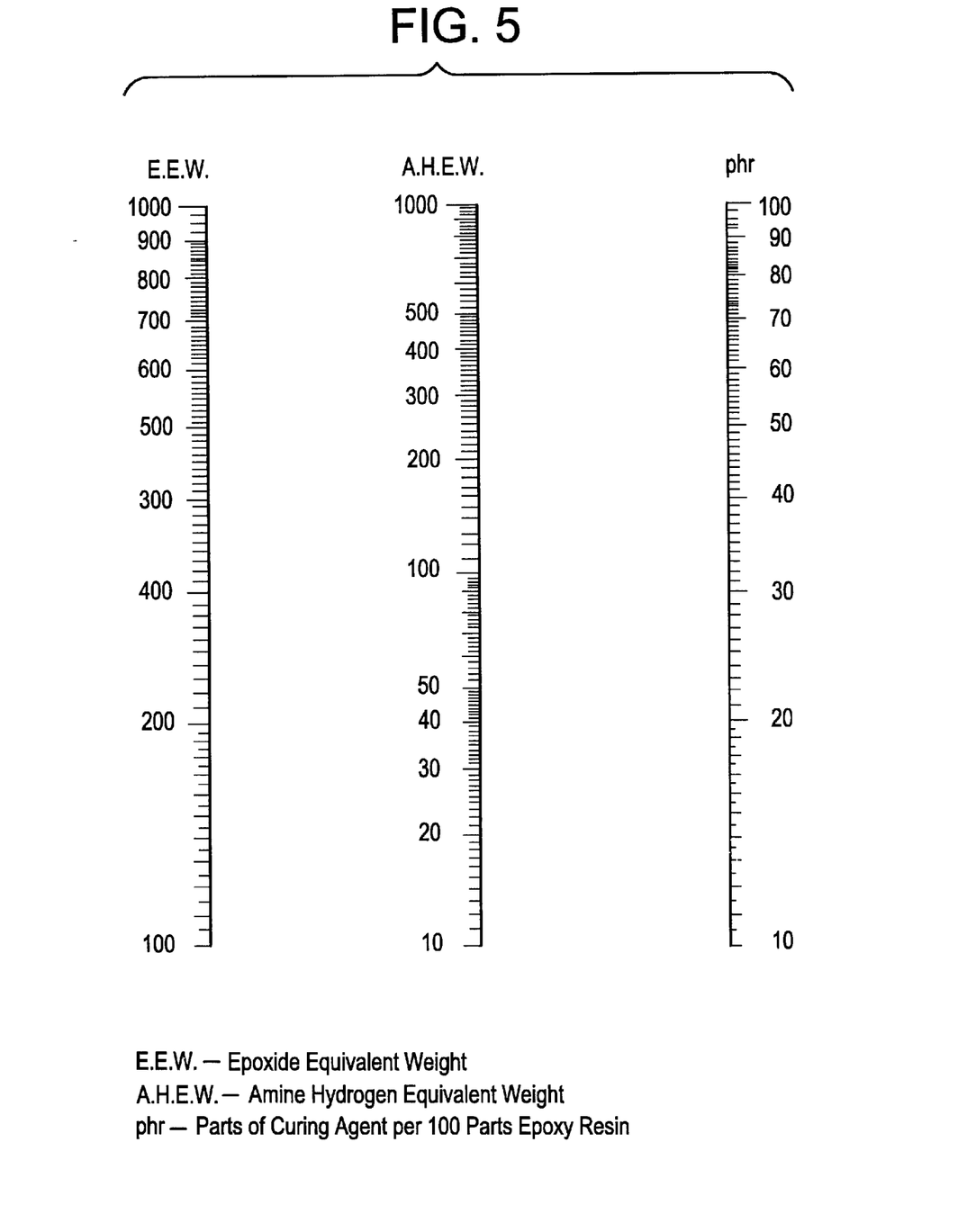
FIG. 5 shows a chart depicting preferred mixing ratios for epoxide resin and amine curing agent.

In mixing parts A and B, the preferred proportion is two parts by weight of the active ingredients of part A for each part by weight of the active ingredients of part B, although this ratio may be varied up to 50% in accordance with the FIG. 5 graph, although the preferred ratio is within 15% of the 2–1 ratio by weight of the active ingredients, in this case, Bisphenol A Type Epoxy Resin and Amidoamine Curing Agent.

Experiments were conducted concerning the inventive adhesive that came up with results that substantiate the use of this adhesive in the inventive process. Table 1 below shows the viscosity of the McSTICK™ adhesive at 70 degrees F initially upon mixing and in one-quarter hour increments thereafter.

TABLE 1

| VISCOSITY @ 70° F.<br>Time after mixing Parts A + B | McSTICK ™<br>Viscosity - cps |
|---|---|
| initial | 325 |
| ¼ hour | 295 |
| ½ hour | 285 |
| ¾ hour | 270 |
| 1 hour | 275 |
| 1¼ hours | 290 |
| 1½ hours | 315 |
| 1¾ hours | 325 |
| 2 hours | 395 |
| 2¼ hours | 465 |
| 2½ hours | 670 |
| 2¾ hours | 675 |
| 3 hours | 805 |
| 3¼ hours | 1115 |
| 3½ hours | 1430 |

As seen from Table 1, the viscosity of the adhesive stays below 1000 cps for at least 3 hours after mixing provided the temperature is maintained at 70 degrees F.

By contrast, Table 2 shows the time from mixing versus the viscosity wherein the ambient temperature was 106 degrees F. when mixing takes place.

TABLE 2

HEATING PART
A and PART B to 106 DEGREES F., BEFORE COMBINING
Both Parts A and B were at 106 degrees F., when combined. They were mixed in a warm jar so the initial temperature did not drop.

| TIME Minutes | TEMPERATURE Degrees Fahrenheit | VISCOSITY cps |
|---|---|---|
| 3 | 109 | 895 |
| 7 | 111 | 910 |
| 12 | 108 | 1145 |
| 17 | 106 | 1345 |
| 22 | 104 | 1590 |
| 27 | 106 | 2225 |
| 32 | 109 | 2425 |
| 63 | 106 | 3725 |
| 90 | 100 | 6800 |

As shown in Table 2, the viscosity of the mixture stays below 1000 cps for only about 7 minutes. As should be understood, a higher viscosity adhesive can be used where the adhesive is heated above room temperature. However, this technique dramatically reduces pot life.

From comparing Tables 1 and 2, it should be understood that if the ambient temperature is maintained as low as possible, preferably at about 70 degrees F., the pot life of the adhesive before it must be discarded and replaced can be as much as 3 hours. In the inventive process, adhesive is used and replenished. Given the extended pot life of the adhesive at 70 degrees F., if one may maintain the ambient temperature of the adhesive at around 70 degrees F., one may operate the process continuously since the adhesive is used and replenished at a high flow rate.

TABLE 3

Examples of such formulas suitable in the process but not limited to them are:

PART A

| | | | | | | | | | | |
|---|---|---|---|---|---|---|---|---|---|---|
| Bisphenol A | | 37.5 | 50 | 13.6 | 25 | 25 | 33 | 12 | 50 | 25 |
| Bisphenol F | 40 | | | | | | | | | |
| Flexible Epoxy | | | | | | | | | | |
| Epidil | 749 | 10 | 12.5 | 15.0 | 25 | 25 | 17 | 17 | | 20 |
| Ancarez | 2364 | | | 14.3 | | | | 14.3 | | |
| Plasticizer | 7.5 | 7.5 | 3.0 | 6.6 | 7.5 | 7.5 | 7.5 | 6.6 | | 6.7 |
| Defoamer | .5 | .5 | .4 | .4 | .5 | .5 | .5 | .4 | 5 | .4 |
| Surfactant | .5 | .5 | .4 | .4 | .5 | .5 | .5 | .4 | 5 | .4 |

PART B

| | | | | | | | | | | |
|---|---|---|---|---|---|---|---|---|---|---|
| Ancamine | | | | | | | | 2.4 | 5 | |
| Amidoamine | 39 | 22.5 | 24 | 22 | | | 6 | 7.2 | 15 | 34.5 |
| IPD | | | | | 13 | | | | | |
| PACM | | | | | | 15.5 | | | | |
| Benzyl Alcohol | | | | | | | 6 | | | |
| Defoamer | .5 | .2 | .25 | .2 | .2 | .2 | .2 | | | .4 |
| Surfactant | .5 | .2 | .25 | .2 | .2 | .2 | .2 | | | .3 |

Concerning Table 3, "EPIDIL" and "ANCAMINE" are Trademarks of Air Products, Inc.; IPD is an abbreviation for "isoplorone diamine"; PACM is an abbreviation for "para amino cyclo hexyl methane".

Table 3 shows variations on the mixtures of part A and part B, respectively, which will still permit adequate and effective practicing of the processes in accordance with the teachings of the present invention. Additionally, it is noted, with reference back to the description of the constituent ingredients of parts A and B as set forth hereinabove, that the essential ingredients are, for part A, Bisphenol A or F Type Epoxy Resin, and for part B, Amidoamine Curing Agent. In part A, Aliphatic DIEPOXIDE Epoxy Resin is provided for the purpose of reducing the viscosity of the Bisphenol A or F Type Epoxy Resin. Any other suitable viscosity reducer can be substituted for the Aliphatic DIEPOXIDE Epoxy Resin. Similarly, any desired defoamer and surfactant may be employed. Concerning part B, again, any suitable defoamer and surfactant may be employed, and any desired viscosity reducer can be employed such as, for example, ancamine reactive diluents, or benzyl alcohol. Again, Table 3 shows the variety in the ratios of the constituent ingredients of part B. If desired, Bisphenol F can be used instead of Bisphenol A in part A. Bisphenol F is more expensive than Bisphenol A but has lower viscosity, thereby requiring less viscosity reducing diluent. Some combination of Bisphenol A and Bisphenol F could also be employed. Bisphenol A and F are products of Shell Chemical. Part A may include 12–99% by weight Bisphenol A or F Type Epoxy Resin. Part B may include 6–99% by weight Amidoamine curing agent.

The epoxy can be diluted with any material that would cause a reduction in its viscosity without harming its adhesive properties. Two examples of such materials are DOW 736 Flexible Epoxy Resin and Air Products 749 Epidil which is a reactive diluent. Preferably, the DOW 736 Flexible Epoxy Resin is not used to avoid emission of odors that might be absorbed by food products such as, for example, coffee. If desired, a plasticizer can be added such as Dipropylene Glycol Dibenzoate or Benzyl Alcohol. These materials not only add flexibility to the adhesive but also reduce the viscosity. Concerning part B, this part is comprised of an Amine compound that can comprise one of the following: Shell Amidoamine Curing Agent, Shell Aliphatic Amidoamine Curing Agent, Air Products 2590 Amidoamine Curing Agent, Isopherone Diamine, Air Products PACM Amidoamine Curing Agent, and Lamide Curing Agent. As explained above, any desired viscosity reducer can be employed in Part B, such as, for example, ancamine reactive diluents, or benzyl alcohol. As explained above, the ratio between the active ingredients of parts A and B is generally determined to be at the stoichiometric ratio as well known to those skilled in the art and as explained with reference to FIG. 5, but, if desired, the ratio between parts A and B can be "off ratio" by a margin of up to but not exceeding 50%. Preferably, the ratio between parts A and B should be within 15% of the stated ratio, i.e., within 15% of the ratio 2 parts part A to 1 part part B.

The following examples demonstrate the effectiveness of the present invention:

EXAMPLE 1

Parts A and B of the adhesive in the proportions of constituent ingredients set forth above were provided. A COMCO flexopress was employed and equipped with a normal UV laminating station. A two blade doctor system was installed and a mixing machine manufactured by Applicants' Assignee was used to mix the adhesive. The adhesive was supplied to a amilox roll to spread 0.8 pounds per ream of adhesive onto a primary film. The adhesive coated primary film was laminated to a secondary web and wound into a finished roll. The process was conducted at room temperature with the laminating nip operating at a speed of about 400 feet per minute. Using this procedure and equipment, various films were laminated including oriented polypropylene, polyester, cast polypropylene, and polyethylene, with and without printing. Films with printing may be considered opaque. Bonds were satisfactory for slitting of the laminated webs within 24 hours. The finished webs complied with all requirements of F.D.A. Rule 175.105.

EXAMPLE 2

Production trials were carried out on a wide web in-line gravure laminator having a web width of 40 to 50 inches. In this instance, the two doctor blade system applied adhesive directly from an engraved roll to the secondary web. No heat was applied in the oven nor was any heat applied to the laminating nip. Various films were laminated in this fashion including oriented polypropylene, polyester, polyethylene, metallized polypropylene and metallized polyethylene. Metallized films may be considered opaque. The laminated rolls were allowed to cure as rolled and satisfactory bonds were achieved within 48 hours. Coating weights were about 0.5 pounds per ream at speeds of 400 feet per minute.

EXAMPLE 3

Some of the laminated film described in EXAMPLE 2 above was separated immediately after coating to obtain sample material coated on one side at about 0.25 pounds per ream. This material was then loaded into the laminating nip of a polyethylene extrusion process to test the product under extrusion conditions. The polyester substrate coated with adhesive was subjected to the hot molten extrudate while laminating it to an aluminum foil structure. The laminated structure of the PET to the foil had very satisfactory bonds immediately after lamination. Almost complete cure was achieved instantaneously.

In operating the system illustrated in FIGS. 1 and 2, one must choose the flow rate of the pump 33. In this regard, Applicants have found that the adhesive 14 will coat 3000 square feet of film for every 1 pound of adhesive. Some coating machines can coat 3000 square feet of film in a single minute. Such a machine would require the use of 1 pound of adhesive per minute minimum. In order to make sure that the chamber 47 is always full of adhesive, Applicants have chosen the mixing equipment 11 and pump 33 so that twice the amount of adhesive can be pumped for the amount that is coated. Thus, for example, where the coating system 10 can coat at a rate wherein 1 pound of adhesive is used every minute, the flow rate of the mixer and pump 33 is chosen so that the pump 33 can pump 2 pounds of adhesive each minute. This rapid recirculation helps to deter creation of pockets or places in the chamber 47 or in the conduits between the chamber 47 and the sump 23 wherein adhesive can become stagnant and thus start to set up or cure. Of course, this problem is exacerbated through the heat inherently generated by friction of the doctor blades 51, 53 against the knurled roll 45. Of course, through adequate ventilation, including use of fans where necessary, the ambient temperature around the adhesive 14 may be controlled to within narrow temperature ranges. In fact, as explained above, the doctor blades themselves may be cooled through water circulation. A heat exchanger (not shown) carries heat away from the water as it is circulated through the blades.

It has been found that rotating piston pumps are effective in mixing and metering the adhesive. The adhesive can be circulated with typical peristaltic pumps.

With reference to FIG. 3, with the above description in mind, the inventive process will be reviewed and explained.

As a first step, one provides a two blade enclosed chamber coating and laminating system such as that which is described in FIGS. 1 and 2 hereinabove, and explained in the description set forth above. Concurrently, one provides a two part adhesive such as described hereinabove that is solventless, 100% solids, has a viscosity in the range of 200 to 400 cps, and maintains a viscosity of less than 1000 at a reasonable room temperature for a period of about 2 to 3 hours and is not affected by moisture.

The adhesive is mixed and supplied to a sump of the coating and laminating system. A pump is provided to pump mixed adhesive from the sump to a coating chamber partially defined by two doctor blades. The pump is provided to pump the adhesive at a flow rate greater than its rate of use so that excess adhesive is returned back to the sump in a recirculation return line.

The adhesive is supplied to the coating chamber and recirculated back to the sump and as adhesive is used, the level of adhesive in the sump is monitored and adhesive is replenished as needed.

The temperature and viscosity of the adhesive are monitored in the sump and the temperature is accordingly maintained within reasonable room temperature limits and the viscosity may be monitored automatically or visually so that when the viscosity exceeds 1000 cps, the user is notified.

If the viscosity of the adhesive in the sump exceeds 1000 cps, the system is shut down and adhesive is cleaned from the system, whereupon adhesive is replenished and the process may resume.

Through use of the inventive process in conjunction with the chosen adhesive, film may be coated and laminated in a quick, safe and effective manner, in a continuous process, and in compliance with F.D.A. Regulation 175.105. Thus, the resulting packaging may be used to package food products.

Figure 4:
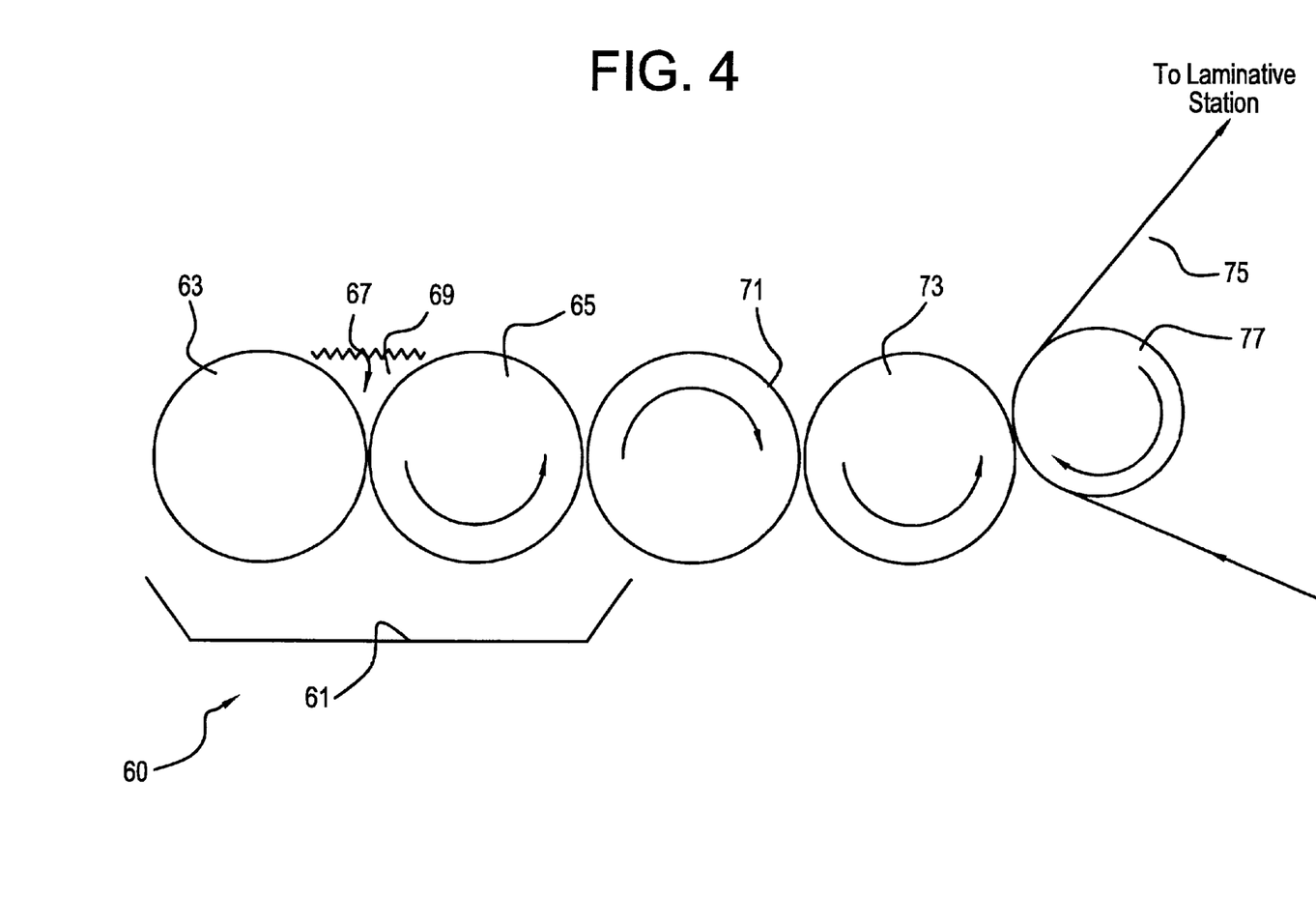
FIG. 4 shows a schematic representation of a five roll coating system.

With reference to FIG. 4, a schematic representation of a five roll coating system is shown. The system designated by the reference numeral 60 includes a sump 61. A metering roll 63 and a transfer roll 65 define, therebetween, a triangular cross-section chamber 67 in which the adhesive 69 is provided in a manner well known to those skilled in the art. As the metering roll 63 and the transfer roll 65 rotate with respect to one another, adhesive 69 is transferred onto the surface of the roll 65 and any adhesive dripping from the metering roll 63 and the transfer roll 65 falls into the sump 61, where it may be recirculated to the chamber 67, if desired.

With further reference to FIG. 4, the transfer roll 65 transfers adhesive to the surface of the transfer roll 71 which transfers adhesive to the surface of the transfer roll 73 from which the adhesive is coated onto a film 75 that is pinched into engagement with the transfer roll 73 by a rubber impression roll 77.

Through the use of the transfer rolls 65, 71 and 73, even a high viscosity adhesive, up to 1200 cps, may be spread uniformly about the surface of the transfer roll 73 where it is transferred to the film 75.

In the operation of the system 60, very little adhesive drips into the sump 61. As such, the system 60 does not require recirculation of the adhesive from the sump 61 to the chamber 67. Through use of the adhesives described hereinabove, and mixed at a viscosity at room temperature of anywhere from 300 cps to 1200 cps, the system 60 can adequately uniformly spread the adhesive about the transfer roll 73 for transfer to the film 75. If desired, a motionless mixer (not shown) can be used to mix parts A and B of the adhesive in a desired ratio and to thereafter supply the mixed adhesive to the chamber 67 defined between the metering roll 63 and the transfer roll 65.

In one example of the use of the system 60, the adhesive 69 is supplied to the chamber 67 at a sufficient rate so that the coating weight of the adhesive on the film 75 as transferred thereto from the transfer roll 73 will be in the range of 1 pound per 3,000 square feet.

Through use of the inventive adhesives in a four or five roll system such as the system depicted in FIG. 4, high speed coating may be achieved, at rates of 500 to 1,500 feet per minute, while no misting occurs, and without emission of VOCs. The system 60 when used in conjunction with the inventive adhesives does not require any heating of the rolls or in the chamber 67. Since the system is maintained at room temperature, the viscosity of the adhesive 69 is maintained substantially uniform throughout the coating process. Uniform temperatures result in uniform coating weights throughout the operation of a coating process.

EXAMPLE 4

A suitable formula that eliminated the flexible epoxy and its odor was run on an Aqua Flex in-line press for a coffee pouch structure. The formula is shown on Table 3 and includes Part A: 25% Bisphenol A, 20% Epidil 749, 6.7% plasticizer, 0.4% defoamer, and 0.4% surfactant; Part B: 34.5% Amidoamine, 0.4% defoamer, and 0.3% surfactant. The formula processed satisfactorily and the finished product proved satisfactory in being able to package the coffee without contaminating it with odor or change in flavor. Subsequent orders were produced with this adhesive with success.

FIG. 5 depicts a chart used to determine an appropriate stoichiometric ratio between the epoxy and curing agent. FIG. 5 is self-explanatory. Applicant has found that the adhesive is effective provided the stoichiometric ratio between epoxy and curing agent is kept to the optimal ratio within ±50%.

As such, an invention has been disclosed in terms of a process of coating and laminating in conjunction with the use of a particular adhesive in so doing which fulfills each and every one of the objects of the invention as set forth hereinabove and provides a new and useful process for laminating using 100% solids adhesive at room temperature of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. A flexographic process for coating and laminating film, including the steps of:
   a) providing a coating and laminating system including:
      i) supply means for supplying mixed adhesive to a coating chamber;
      ii) return means for returning excess adhesive to a sump;
      iii) a first roller exposed to said coating chamber and receiving adhesive thereon; and
      iv) a second roller engaging said first roller, said second roller receiving adhesive from said first roller;
   b) providing an adhesive made up of Part A and Part B mixed together, wherein:
      i) Part A includes 12–99%, by weight, Bisphenol A or F Type Epoxy Resin;
      ii) Part B includes 6–99%, by weight, Amine Curing Agent;
      iii) said adhesive being 100% solids and composed of constituent ingredients substantially precluding said adhesive from imparting odors to food products packaged in films laminated with said adhesive;
   c) determining optimal stoichiometrical ratio between epoxy resin and curing agent;
   d) mixing parts A and B at a ratio such that the stoichiometrical ratio between epoxy resin and curing agent is at said optimal stoichiometrical ratio ±50%, to form said adhesive;
   e) circulating said adhesive between said sump and said chamber;
   f) operating said rollers and thereby coating a first piece of film with adhesive; and
   g) laminating said first piece of film to a second piece of film.

2. The process of claim 1, further including the step of, during said circulating step, recirculating said adhesive from said chamber to said sump.

3. The process of claim 1, further including the step of mixing said adhesive in a mixer and supplying mixed adhesive to said sump.

4. The process of claim 1, further including the step of defining said chamber, in part, by sides of two spaced doctor blades.

5. The process of claim 4, further including the step of further defining said chamber, in part, by a surface of said first roller.

6. The process of claim 1, further including the step of maintaining temperature of said adhesive at about 70 degrees Fahrenheit.

7. The process of claim 1, further including the step of maintaining temperature of said adhesive at a temperature range of 50–110° F.

8. The process of claim 7, wherein room temperature is defined as 50–100 degrees F.

9. The process of claim 1, wherein said first roller is knurled.

10. The process of claim 1, wherein at least one of said films is metallized.

11. The process of claim 1, wherein at least one of said films is opaque.

12. The process of claim 1, wherein said circulating step is carried out using a pump.

13. The process of claim 1, further including the step of sensing level of adhesive in said sump and, responsive to reduction in level below a preset level, replenishing adhesive thereto.

14. The process of claim 1, further including the step of sensing level of adhesive in said mixer and, responsive to reduction in level below a preset level, replenishing adhesive to said sump.

15. The process of claim 1, wherein:
   a) Part A consists of:
      34%, by weight, Bisphenol A Type Epoxy Resin;
      51%, by weight, Aliphatic DIEPOXIDE Epoxy Resin;
      1%, by weight, Nonionic defoamer;
      13%, by weight, Dipropylene Glycol Dibenzoate; and
      1%, by weight, Silicone Free Surfactant;
   b) Part B consists of:
      79%, by weight, Amine Curing Agent;
      20%, by weight, Aliphatic Amidoamine Curing Agent;
      0.5%, by weight, Nonionic defoamer; and
      0.5%, by weight, Silicone Free Surfactant; and
   c) said adhesive consists of about 66⅔%, by weight, Part A and about 33⅓%, by weight, Part B.

16. A flexographic process for coating and laminating film, including the steps of:
   a) providing a coating and laminating system including:
      i) supply means for supplying mixed adhesive to a coating chamber including a mixer supplying mixed adhesive to a sump, said chamber being defined, in part, by side walls of two spaced doctor blades;
      ii) return means for returning excess adhesive to said sump;
      iii) circulation means for circulating adhesive from said sump to said chamber and back to said sump;
      iv) a first knurled roller exposed to said coating chamber and receiving adhesive thereon; and
      v) a second roller engaging said first roller, said second roller receiving adhesive from said first roller;
   b) providing an adhesive made up of Part A and Part B mixed together, wherein:
      i) Part A consists of:
         34%, by weight, Bisphenol A Type Epoxy Resin;
         51%, by weight, Aliphatic DIEPOXIDE Epoxy Resin;
         1%, by weight, Nonionic defoamer;
         13%, by weight, Dipropylene Glycol Dibenzoate; and
         1%, by weight, Silicone Free Surfactant;
      ii) Part B consists of:
         79%, by weight, Amine Curing Agent;
         20%, by weight, Aliphatic Amidoamine Curing Agent;
         0.5%, by weight, Nonionic defoamer; and
         0.5%, by weight, Silicone Free Surfactant; and
      iii) said adhesive consists of 66⅔%, by weight, Part A and 33⅓%, by weight, Part B;
   c) circulating said adhesive between said sump and said chamber and back to said sump;
   d) operating said rollers and thereby coating a first piece of film with adhesive; and
   e) laminating said first piece of film to a second piece of film.

17. The process of claim 16, further including the step of further defining said chamber, in part, by a surface of said first roller.

18. The process of claim 16, further including the step of maintaining temperature of said adhesive at a temperature range of 50–110° F.

19. The process of claim 18, wherein room temperature is defined as 50–100 degrees F.

20. The process of claim 16, wherein at least one of said films is either metallized or opaque.

21. A process for coating and laminating film, including the steps of:
   a) providing a coating and laminating system including:
      i) supply means for supplying mixed adhesive to a coating chamber;
      ii) return means for returning excess adhesive to a sump; and
      iii) a roller exposed to said coating chamber and receiving adhesive thereon; and
   b) providing an adhesive made up of Part A and Part B mixed together, wherein:
      i) Part A consists of:
         34%, by weight, Bisphenol A or F Type Epoxy Resin;
         51%, by weight, Aliphatic DIEPOXIDE Epoxy Resin;
         1%, by weight, Nonionic defoamer;
         13%, by weight, Dipropylene Glycol Dibenzoate; and
         1%, by weight, Silicone Free Surfactant;
      ii) Part B consists of:
         79%, by weight, Amine Curing Agent;
         20%, by weight, Aliphatic Amidoamine Curing Agent;
         0.5%, by weight, Nonionic defoamer; and
         0.5%, by weight, Silicone Free Surfactant; and
      iii) said adhesive consists of 66⅔%, by weight, Part A and 33⅓%, by weight, Part B;
   c) circulating said adhesive between said sump and said chamber;
   d) operating said roller and coating a first piece of film with adhesive; and
   e) laminating said first piece of film to a second piece of film.

22. The process of claim 21, comprising a gravure process.

23. A process for coating and laminating film, including the steps of:
   a) providing a coating and laminating system including:
      i) supply means for supplying mixed adhesive to a coating chamber;
      ii) return means for returning excess adhesive to a sump; and
      iii) a roller exposed to said coating chamber and receiving adhesive thereon; and
   b) providing an adhesive having the following properties:
      i) 100% solids;
      ii) solventless;
      iii) zero volatile organic compounds (VOCs);
      iv) viscosity of 200–1000 cps at a temperature of 50°–80° F.;
      v) pot life of up to 3 hours at 50°–80° F.;
      vi) unaffected by moisture; and
      vii) usable in laminating films to be used as food product packaging;
   c) circulating said adhesive between said sump and said chamber;
   d) operating said roller and coating a first piece of film with adhesive; and
   e) laminating said first piece of film to a second piece of film.

24. The process of claim 23, comprising a gravure process.

25. The process of claim 23, wherein said adhesive cures at room temperature.

26. A process for coating and laminating film, including the steps of:
   a) providing a coating and laminating system including supply means for supplying mixed adhesive to a first roller;
   b) a second roller engaging said first roller, said second roller receiving adhesive from said first roller;
   c) providing an adhesive having an operating temperature viscosity of 200 to 1500 cps and made up of Part A and Part B mixed together, wherein:
      i) Part A consists of a mixture including Bisphenol A or F Type Epoxy Resin;
      ii) Part B including Amine Curing Agent;
      iii) said adhesive being 100% solids and composed of constituent ingredients substantially precluding said adhesive from imparting odors to food products packaged in films laminated with said adhesive, said adhesive having a pot life of up to 3 hours at 50° F. to 80° F.;
   d) determining optimal stoichiometrical ratio between epoxy resin and curing agent;
   e) mixing parts A and B at a ratio such that the stoichiometrical ratio between epoxy resin and curing agent is at said optimal stoichiometrical ratio ±75%, to form said adhesive;
   f) providing said adhesive to said first roller;
   g) operating said rollers and thereby coating a first piece of film with adhesive; and
   h) laminating said first piece of film to a second piece of film.

27. The process of claim 26, further including the step of mixing said adhesive in a mixer and supplying mixed adhesive to a chamber defined between said first and second rollers.

28. The process of claim 26, further including the step of maintaining temperature of said adhesive at about 70 degrees Fahrenheit.

29. The process of claim 26, further including the step of maintaining temperature of said adhesive at a temperature range of 50–110° F.

30. The process of claim 29, wherein room temperature is defined as 50–100 degrees F.

31. The process of claim 26, wherein said system comprises a four roll coating system.

32. The process of claim 26, wherein said system comprises a five roll coating system.

33. The process of claim 26, further including the step of conveying said films at a rate of 200 to 1,500 feet per minute.

34. A process for coating and laminating film, including the steps of:
   a) providing a coating and laminating system including supply means for supplying mixed adhesive to a first roller;
   b) engaging a second roller to said first roller and said second roller adapted to receive adhesive from said first roller; and
   c) providing an adhesive having the following properties:
      i) 100% solids;
      ii) solventless;
      iii) zero volatile organic compounds (VOCs);
      iv) viscosity of 200–1200 cps at operating temperature;
      v) pot life of up to 3 hours at 50°–80° F.;
      vi) unaffected by moisture; and
      vii) usable in laminating films to be used as food product packaging;
   d) supplying said adhesive to said first roller;
   e) transferring adhesive to said second roller and coating a first piece of film with adhesive; and
   f) laminating said first piece of film to a second piece of film.

35. The process of claim 34, wherein said adhesive cures at room temperature.

36. The process of claim 34, wherein said system comprises a four roll coating system.

37. The process of claim 34, wherein said system comprises a five roll coating system.

38. The process of claim 34, further including the step of, during said coating and laminating step, moving said films at a speed of up to 1,500 feet per minute.

* * * * *